(12) United States Patent
Babanova et al.

(10) Patent No.: US 11,947,369 B2
(45) Date of Patent: Apr. 2, 2024

(54) FLUID FLOW CONTROL FOR WATER TREATMENT SYSTEMS

(71) Applicant: Aquacycl, Inc., Escondido, CA (US)

(72) Inventors: Sofia Malinova Babanova, San Diego, CA (US); Orianna Bretschger, San Diego, CA (US); José Daniel Barocio Montemayor, Baja California (MX); Gerardo Garcia Serrano, Baja California (MX)

(73) Assignee: Aquacycl, Inc., Escondido, CA (US)

( * ) Notice: Subject to any disclaimer, the term of this patent is extended or adjusted under 35 U.S.C. 154(b) by 0 days.

(21) Appl. No.: 18/181,526

(22) Filed: Mar. 9, 2023

(65) Prior Publication Data
US 2023/0205236 A1   Jun. 29, 2023

Related U.S. Application Data

(62) Division of application No. 17/202,168, filed on Mar. 15, 2021, now Pat. No. 11,604,482.

(Continued)

(51) Int. Cl.
*G05D 7/06* (2006.01)
*C02F 3/00* (2023.01)

(52) U.S. Cl.
CPC ........... *G05D 7/0629* (2013.01); *C02F 3/005* (2013.01); *C02F 3/006* (2013.01); *C02F 2209/005* (2013.01); *C02F 2209/40* (2013.01)

(58) Field of Classification Search
CPC ...... G05D 7/0629; G05D 7/067; C02F 3/005; C02F 3/006; C02F 2209/005;

(Continued)

(56) References Cited

U.S. PATENT DOCUMENTS 1,830,353 A * 11/1931 Dunbar .................. C02F 1/42
210/128
3,235,234 A    2/1966 Beaudoin
(Continued)

FOREIGN PATENT DOCUMENTS

CN    101315985 A    12/2008
CN    101702440 A    5/2010
(Continued)

OTHER PUBLICATIONS

Aquam Technologies_SBIO'18, posted at youtube.com, posted Apr. 19, 2018, online, URL:https://www.youtube.com/watch?v=Sp795_Erp4c (Year: 2018).

(Continued)

*Primary Examiner* — Ekandra S. Miller-Cruz
(74) *Attorney, Agent, or Firm* — Perkins Coie LLP

(57) ABSTRACT

Disclosed are devices, systems and methods for operation and control of gravity-fed fluid flows in water and wastewater related systems. The disclosed flow control system uses gravity to provide a flow of a fluid from a fluid source and a motorized flow control device fluidically coupled to the fluid source to control a defined flow rate of the flow by changing a position of an internal volume of the flow control device through which the fluid flows relative to a fixed level of the fluid in the fluid source. The disclosed devices, systems and methods can be used in a wide variety of systems for environmental and low-energy demand applications such as, for example, a wastewater treatment system to control a flow of wastewater in the system.

17 Claims, 6 Drawing Sheets

Related U.S. Application Data

(60) Provisional application No. 62/990,257, filed on Mar. 16, 2020.

(58) Field of Classification Search
CPC ............ C02F 2209/40; C02F 2209/006; C02F 2209/008; C02F 1/008
USPC ........................................................ 210/614
See application file for complete search history.

(56) References Cited

U.S. PATENT DOCUMENTS

| | | | |
|---|---|---|---|
| 3,879,285 A * | 4/1975 | Yost | C02F 3/1242 |
| | | | 210/201 |
| D236,463 S | 8/1975 | Giovagnoli et al. | |
| D276,604 S | 12/1984 | King | |
| 4,978,429 A | 12/1990 | Sears | |
| D357,056 S | 4/1995 | Linton | |
| 5,449,460 A | 9/1995 | Buisman | |
| 5,736,049 A | 4/1998 | Bundy | |
| 6,962,164 B2 | 11/2005 | Lull | |
| 7,125,200 B1 | 10/2006 | Fulton | |
| 7,922,907 B2 | 4/2011 | Hassan et al. | |
| D642,118 S | 7/2011 | Uneo | |
| D646,636 S | 10/2011 | Riimala | |
| 8,366,932 B1 | 2/2013 | Sung | |
| 8,415,037 B2 | 4/2013 | Nealson et al. | |
| 8,460,509 B2 | 6/2013 | Lakatos | |
| 8,524,402 B2 | 9/2013 | He et al. | |
| 8,597,513 B2 | 12/2013 | Borole et al. | |
| D729,736 S | 5/2015 | Matthews | |
| 9,321,666 B1 | 4/2016 | Reilly | |
| D758,527 S | 6/2016 | Quiblier | |
| D771,769 S | 11/2016 | Pin | |
| 9,505,636 B2 | 11/2016 | Bretschger | |
| 9,828,272 B2 | 11/2017 | Krieger | |
| D862,378 S | 10/2019 | Leitner | |
| D864,111 S | 10/2019 | Gleave | |
| D864,622 S | 10/2019 | Lim | |
| 10,479,699 B1 * | 11/2019 | Chandler, Jr. ............. C02F 1/78 | |
| D870,058 S | 12/2019 | Archer | |
| D870,686 S | 12/2019 | Archer | |
| D875,207 S | 2/2020 | Babanova et al. | |
| D875,208 S | 2/2020 | Babanova et al. | |
| 10,570,039 B2 | 2/2020 | Bretschger et al. | |
| D899,561 S | 10/2020 | Babanova et al. | |
| D902,842 S | 11/2020 | Babanova et al. | |
| 11,109,543 B2 * | 9/2021 | Lu ........................... B05B 1/205 | |
| 2003/0190742 A1 | 10/2003 | Whiteman | |
| 2004/0045899 A1 | 3/2004 | Humphrey | |
| 2004/0060857 A1 | 4/2004 | Pattee | |
| 2004/0188334 A1 | 9/2004 | McWhirter | |
| 2005/0244957 A1 | 11/2005 | Stock | |
| 2005/0269262 A1 | 12/2005 | McBride | |
| 2006/0096917 A1 | 5/2006 | Rose et al. | |
| 2007/0200262 A1 | 8/2007 | Hills | |
| 2008/0292912 A1 | 11/2008 | Logan et al. | |
| 2009/0218299 A1 | 9/2009 | Cote | |
| 2009/0226772 A1 | 9/2009 | Stark et al. | |
| 2010/0003543 A1 | 1/2010 | Zhou | |
| 2011/0042309 A1 | 2/2011 | Keeton | |
| 2011/0140457 A1 | 6/2011 | Lakatos | |
| 2012/0055859 A1 | 3/2012 | Reilly | |
| 2012/0093692 A1 | 4/2012 | Blomberg | |
| 2012/0152835 A1 | 6/2012 | Cardenas et al. | |
| 2013/0266876 A1 | 10/2013 | Shechter | |
| 2013/0302703 A1 | 11/2013 | Bretschger et al. | |
| 2014/0021137 A1 | 1/2014 | Smiddy | |
| 2014/0110323 A1 | 4/2014 | Al-Anzi | |
| 2014/0141286 A1 | 5/2014 | Bretschger et al. | |
| 2014/0266001 A1 | 9/2014 | Wilde | |
| 2015/0014246 A1 | 1/2015 | Mcfadden | |
| 2015/0251934 A1 | 9/2015 | Bretschger | |
| 2015/0349350 A1 * | 12/2015 | Liu ..................... H01M 4/8657 |
| | | | 429/2 |
| 2016/0083952 A1 | 3/2016 | Lee | |
| 2016/0115062 A1 | 4/2016 | Krieger | |
| 2017/0275193 A1 | 9/2017 | Graves | |
| 2017/0342698 A1 | 11/2017 | Fink | |
| 2018/0097237 A1 | 4/2018 | Chadwick | |
| 2019/0301029 A1 | 10/2019 | May | |
| 2020/0002200 A1 | 1/2020 | Bretschger et al. | |
| 2020/0036029 A1 | 1/2020 | Babanova et al. | |
| 2020/0270152 A1 | 8/2020 | Bretschger et al. | |
| 2020/0270153 A1 | 8/2020 | Babanova et al. | |

FOREIGN PATENT DOCUMENTS

| | | |
|---|---|---|
| CN | 103098283 A | 5/2013 |
| CN | 103262323 A | 8/2013 |
| CN | 104466216 A | 3/2015 |
| CN | 105470546 A | 4/2016 |
| CN | 107720938 A | 2/2018 |
| DK | 179765 B1 | 5/2019 |
| JP | 2014008461 A | 1/2014 |
| KR | 200314231 Y1 | 5/2003 |
| WO | 2007131022 A2 | 11/2007 |
| WO | 2011088348 A3 | 7/2011 |
| WO | 2012081001 A1 | 6/2012 |
| WO | 2013071401 A1 | 5/2013 |
| WO | 2014144705 A2 | 9/2014 |

OTHER PUBLICATIONS

Babanova, Sofia et al. "New Pretreatment Approaches to increase efficiency of anaerobic digesters", no date. Aquacycl LLC., pp. 1-13.

Babanova, Sofia. "New perspectives in sugar industry wastewater treatment," International Sugar Journal, Aug. 2020, pp. 62-65 (2pages).

Biffinger, Justin C., et al., "Engineering Microbial Fuels Cells: Recent Patents and New Directions", US Naval Research Laboratory, Paper 22—http://digitalcommons.unl.edu/usnavyresearch/22 (2008) (7 pages).

Chung, Kyungmi, et al., "Continuous Power Generation and Microbial Community Structure of the Anode Biofilms in a Three-Stage Microbial Fuel Cell System", Appl Microbial Biotechnol (2009) 83:965-977.

Egbadon, Emmanuel, et al., "Simultaneous Generation of Bioelectricity and Treatment of Swine Wastewater in a Microbial Fuel Cell", International Letters of Natural Sciences—SSN: 2300-9675, vol. 54, pp. 100-107.

Eppinger, Mark, et al., "Comparative Analysis of Four Campylobacterales", Nature Reviews—Microbiology—vol. 2, Nov. 2004, pp. 1-16.

Ginige, Maneesha P., et al., "Investigation of an Acetate-Fed Denitrifying Microbial Community by Stable Isotope Probing, Full-Cycle rRNA Analysis, and Fluorescent In Situ Hybridization-Microautoradiography", Applied and Environmental Microbiology, vol. 71, No. 12—Dec. 2005, p. 8683-8691.

He, Weihua, et al., "The Effect of Faw Modes and Electrode Combinations on the Performance of a Multiple Module Microbial Fuel Cell Installed at Wastewater Treatment Plant", Water Research 105 (2016) 351-360.

Hutchinson, Adam J., et al., "Analysis of Carbon Fiber Brush Loading in Anodes on Startup and Performance of Microbial Fuel Cells", Journal of Power Sources 196 (2011) 9213-9219.

Ichihashi, 0., et al., "Removal and Recovery of Phosphorus as Struvite From Swine Wastewater Using Microbial Fuel Cell", Bioresource Technology 114 (2012) 303-307.

International Search Report and Written Opinion dated Sep. 30, 2019 of PCT/US2019/039899 (14 pages).

International Search Report and Written Opinion dated Jun. 10, 2020 of PCT/US2020/020177 (9 pages).

Ishii, Shun'Ichi, et al., "A Novel Metatranscriptomic Approach to Identify Gene Expression Dynamics During Extracellular Electron Transfer", Nature Communications, 14:1601 I DOI: 10.1038/ncomms2615 I www.nature.com/naturecommunications—I Accepted Feb. 19, 2013 I Published Mar. 19, 2013—pp. 1-10.

(56) References Cited

OTHER PUBLICATIONS

Ishii, Shun'Ichi, et al., "Identifying the Microbial Communities and Operational Conditions for Optimized Wastewater Treatment in Microbial Fuel Cells", Water Research 47 (2013) 7120-7130.
Jimenez, Jose I., et al., "Genomic Insights in the Metabolism of Aromatic Compounds in Pseudomonas", Pseudomonas, vol. 3—Kluwer Academic/ Plenum Publishers, New York, 2004—pp. 425-462.
Kelly, Patrick T., et al., "Nutrients Removal and Recovery in Bioelectrochemical Systems: A review", Bioresource Technology 153 (2014) 351-360.
Kim, Jung R., et al., "Analysis of Ammonia Loss Mechanisms in Microbial Fuel Cells Treating Animal Wastewater", Biotechnology and Bioengineering, vol. 99, No. 5, Apr. 1, 2008—pp. 1120-1127.
Kim, Jung R., et al., "Removal of Odors from Swine Wastewater by Using Microbial Fuel Cells", Applied and Environmental Microbiology, Apr. 2008, p. 2540-2543—vol. 74, No. 8.
Kim, Kyoung-Yeol, et al., "Continuous Treatment of High Strength Wastewaters Using Air-Cathode Microbial Fuel Cells", Bioresource Technology 221 (2016) 96-101.
Lebrecht et al. Treating Sulfur in Wastewater. Feb. 2015 [Retrieved May 3, 2020) Retrieved from Internet URL: <http://www.airproducts.com/-/media/downloads/w/wastewater-treatmenVdata-sheets/en-treating-sulfur-in-wastewater.pdf >. pp. 1-5.
Lim, Seung J., et al., "Swine Wastewater Treatment Using a Unique Sequence of Ion Exchange Membranes and Bioelectrochemical System", Bioresource Technology 118 (2012) 163-169.
Lu, Mengqian, et al., "Long-term Performance of a 20-L Continuous Faw Microbial Fuel Cell for Treatment of Brewery Wastewater", Journal of Power Sources xxx (2017) 1-14.
Mann, Ethane., et al., "Pseudomonas Biofilm Matrix Composition and Niche Biology", FEMS Microbial Rev 36 (2012) 893-916.
Matlock, Marty, et al., "A Life Cycle Analysis of Water Use in U.S. Pork Production", University of Arkansas I Division of Agriculture I 78 pages (2011).
Mcilroy, Simon J., et al., "Identification of Active Denitrifiers in Full-scale Nutrient Removal Wastewater Treatment Systems", Environmental Microbiology (2016) 18(1), 50-64.
Min, Booki, et al., "Electricity Generation From Swine Wastewater Using Microbial Fuel Cells", Water Research 39 (2005) 4961-4968.
Molognoni, Daniele, et al., "Multiparametric Control for Enhanced Biofilm Selection in Microbial Fuel Cells", J Chem Technol Biotechnol 2016; 91: 1720-1727.
Sander, Elisa M., et al., "Dissimilatory Nitrate Reduction to Ammonium as an Electron Sink During Cathodic Denitrification", RSC Adv.,2015, 5, 86572-86577.
Tharali, Akshay D. et al., "Microbial Fuel Cells in Bioelectricity Production", Frontiers in Life Science, 2016—vol. 9, No. 4, 252-266SSN: 2155-3769 (Print) 2155-3777 (Online) Journal homepage: http://www.tandfonline.com/loi/tfls20.

Van Den Berg, Eveline M., et al., "DNRA and Denitri!cation Coexist over a Broad Range of Acetate/N-NO3-Ratios, in a Chemostat Enrichment Culture", Frontiers in Microbiology I www.frontiersin.org—Nov. 2016 I vol. 7 I Article 1842—13 pages.
Van Lier, Jules B., et al., "Anaerobic Wastewater Treatment", Biological Wastewater Treatment: Principles Modeling and Design—2008—ISBN: 9781843391883.
Vilajeliu-Pons, Anna, et al., "Microbiome Characterization of MFCs Used for the Treatment of Swine Manure", Journal of Hazardous Materials 288 (2015) 60-68.
Virdis, Bernardino, et al., "Microbial Fuel Cells for Simultaneous Carbon and Nitrogen Removal", Water Research 42 (2008) 3013-3024.
Wallace, Mark. Tackling the water crisis will be just as hard as it sounds: As entrepreneurs grapple with water sustainability, they find big challenges lie beneath the surface. Mar. 22, 2019 (Retrieved on Feb. 11, 2020, retrieved from the internet URL: www.fastcompany.com/90323352/tackling-the-water-crisis-will-be-just-as-hard-as-it-shounds. pp. 1-13.
Winfield, Jonathan, et al., "Investigating the Effects of Fuidic Connection Between Microbial Fuel Cells", Bioprocess Biosyst Eng (2011) 34:477-484.
Zhuang, Li, et al., "Scalable microbial Fuel Cell (MFC) Stack for Continuous Real Wastewater Treatment", Bioresource Technology 106 (2012) 82-88.
Zhuang, Li, et al., "Substrate Cross-Conduction Effect on the Performance of Serially Connected Microbial Fuel Cell Stack", Electrochemistry Communications 11 (2009) 937-940.
European Patent Office, Extended European search report for EP 19826324.6, dated Feb. 2, 2022, 12 pages.
Chinese Patent Office, First Office Action for CN 201980055562.7, dated Jul. 20, 2022, 37 pages with machine translation.
Singapore Patent Office, Search Report for SG 11202109330V, dated Jul. 22, 2022, 2 pages.
Singapore Patent Office, Written Opinion for SG 11202109330V, dated Jul. 25, 2022, 7 pages.
No Author. Flow Resistance, Elveflow, 2022, pp. 1-6.
Chinese Patent Office, Second Office Action for CN 201980055562.7, dated Mar. 22, 2023, English Translation, 21 pages.
US Patent & Trademark Office, Non-Final Office Action for U.S. Appl. No. 17/464,197, dated May 18, 2023, 20 pages.
Singapore Patent Office, Written Opinion for SG 11202109330V, dated May 17, 2023, 3 pages.
Singh, Kunwar Vikramaditya, et al. "Approaches in microbial fuel cell array arrangements for conventional DC battery charger." 2018 2nd International Conference on Inventive Systems and Control (ICISC). IEEE, 2018.
Israel Patent Application No. 279787 Office Action dated Jun. 22, 2023, pp. 1-7.
Chinese Patent Office, Third Office Action for CN 201980055562.7, dated Jul. 15, 2023, English Translation, 21 pages.

\* cited by examiner

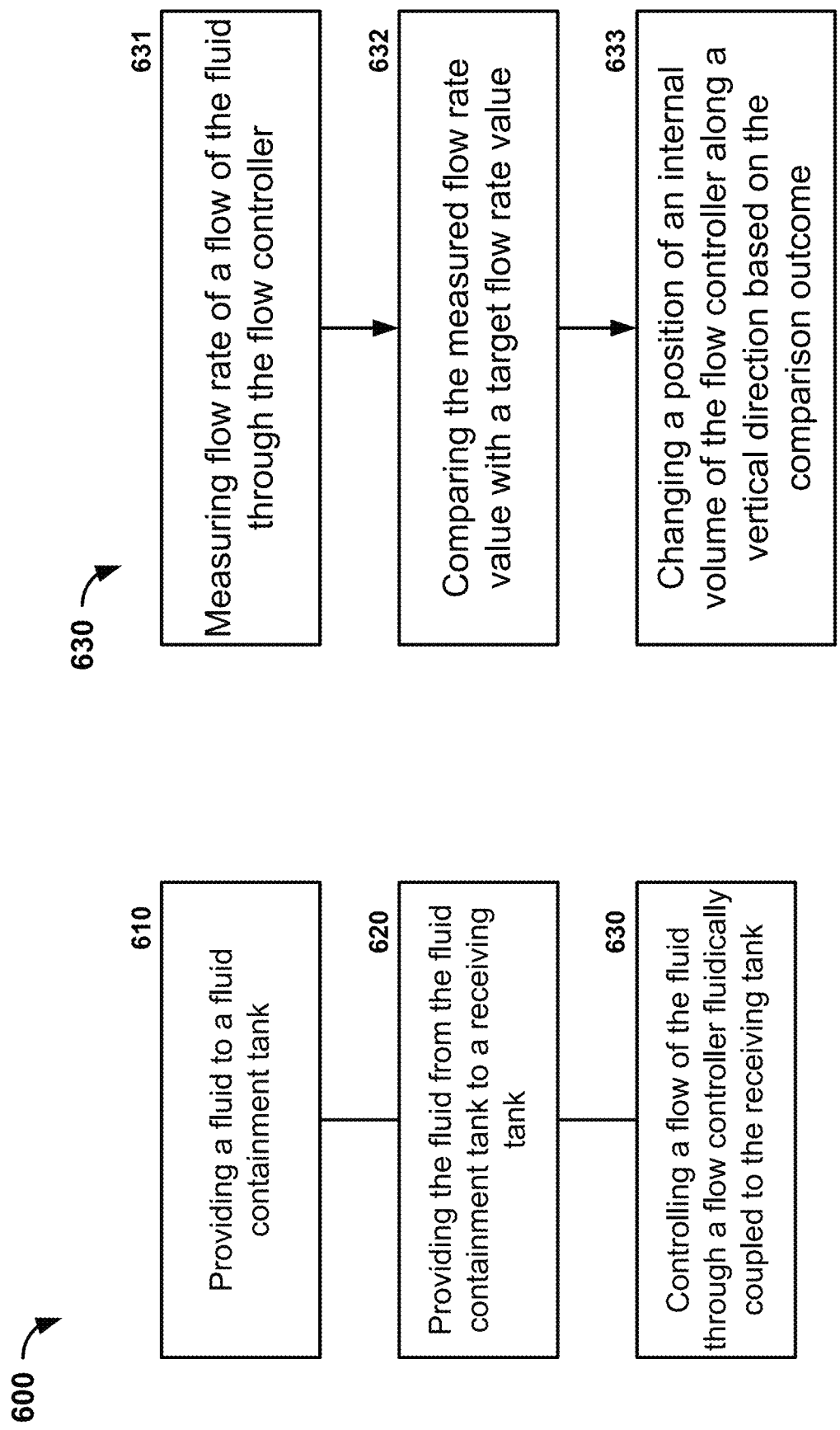

FLUID FLOW CONTROL FOR WATER TREATMENT SYSTEMS

CROSS-REFERENCE TO RELATED APPLICATIONS

This patent document is a divisional of and claims priority to and the benefit of U.S. patent application Ser. No. 17/202,168, titled "FLUID FLOW CONTROL DEVICES FOR WATER TREATMENT SYSTEMS" and filed on Mar. 15, 2021, which claims priority to and the benefits of U.S. Provisional Patent Application No. 62/990,257, titled "FLUID FLOW CONTROL DEVICES FOR WATER TREATMENT SYSTEMS" and filed on Mar. 16, 2020. The entire content of the aforementioned patent application is incorporated by reference as part of the disclosure of this patent document.

TECHNICAL FIELD

This patent document relates to water and wastewater technology.

BACKGROUND

Fluid flow control devices regulate change in fluidic properties, such as flow velocity, pressure, density, and temperature, as well as the pattern or type of fluid flow. As such, devices for controlling the flow of fluids are beneficial in a variety of fluidic systems.

SUMMARY

Disclosed is an automated and remote flow control system for operations and control of gravity-fed fluid flows in water and wastewater related systems. The disclosed flow control system uses gravity to provide the flow and a motorized flow control device to control a defined flow rate.

In some embodiments in accordance with the present technology, a device for fluid flow control in wastewater treatment includes a wastewater containment tank fluidically couplable to an external fluid input device, such as a wastewater supplying system, and structured to enclose an interior space to contain input fluid, such as pre-treated or raw wastewater, when received from the external fluid input device, the wastewater containment tank comprising a first access opening to the interior space to allow the input fluid to enter the interior space, and a second access opening to the interior space to allow the input fluid to exit the interior space to an external fluid processing device, such as a wastewater treatment device to yield a treated water that is outputted out of an output port of the external fluid processing device; and a flow control system fluidically coupled to the external fluid processing device, where the flow control system comprises an enclosure having (i) an inflow port, (ii) an outflow port, and (iii) an internal volume between the inflow port and the outflow port, the inflow port providing a third access opening to the internal volume to allow a fluid to enter the internal volume, and the outflow port providing a fourth access opening to the internal volume to allow the fluid to exit the internal volume, and an actuator assembly configured to move the enclosure along a vertical direction aligned with the direction of gravity so as to control a flow of the fluid through and out of the flow control system, wherein the flow control system is configured to control a flow rate of the fluid through the internal volume by changing a position of the internal volume relative to (1) a position of the external fluid processing device and (2) an upper level of the input fluid in the wastewater containment tank along the vertical direction, wherein a change of the position of the internal volume changes a hydraulic resistance of a path from the wastewater containment tank to the outflow port of the flow control system through the internal volume.

Example embodiments of the device can include one or more of at least the following features. In some embodiments of the device, for example, the wastewater containment tank is fluidically couplable to a wastewater supply or pretreatment system, and the input fluid contained by the wastewater containment tank includes raw or pre-treated wastewater. In some embodiments of the device, for example, the wastewater containment tank of the device is fluidically couplable to a microbial fuel cell (MFC) device, as the external fluid processing device fluidically coupled to the flow control system, the MFC device having an input port to allow the exited input fluid to enter the MFC device from the wastewater containment tank, wherein the MFC device is operable to bioelectrochemically process the exited input fluid by concurrently generating electrical energy and digesting matter in the exited input fluid to yield the treated water that is outputted out of an output port of the MFC device to the flow control system. In some embodiments of the device, for example, the enclosure of the flow control system is configured in an inverse U-like shape such that the inflow port and the outflow port are lower in the vertical direction than the interior volume. In some embodiments of the device, for example, the actuator assembly of the flow control system comprises a holding plate coupled to the enclosure; a shaft coupled to the holding plate and aligned in the vertical direction; and a motor operatively coupled to the shaft to cause the shaft to move so as to drive the holding plate to move in the vertical direction.

In some embodiments in accordance with the present technology, a flow controller device for controlling a flow rate of a fluid includes an enclosure having (i) an inflow port, (ii) an outflow port, and (iii) an internal volume between the inflow port and the outflow port, wherein the inflow port is configured to allow a fluid to enter the internal volume, and wherein the outflow port is configured to allow the fluid to exit the internal volume; and an actuator assembly configured to move the enclosure along a vertical direction aligned with the direction of gravity so as to control a flow of the fluid through and out of the flow controller device, wherein the flow controller device is configured to control a flow rate of the fluid through the internal volume by changing a position of the internal volume along the vertical direction relative to (1) a position of a receiving tank that provides the fluid to the inflow port of the flow controller device and (2) an upper level of the fluid in a fluid containment tank that supplies the fluid to the receiving tank, wherein a change of the position of the internal volume changes a hydraulic resistance of a path from the fluid containment tank to the outflow port of the flow controller through the internal volume.

In some embodiments in accordance with the present technology, a method of controlling a fluid flow rate includes providing a fluid to a fluid containment tank structured to enclose a first interior space to contain the fluid; providing the fluid from the fluid containment tank to a receiving tank fluidically coupled to the fluid containment tank and structured to enclose a second interior space to contain the fluid; and controlling a flow of the fluid through a flow controller fluidically coupled to the receiving tank by changing a position of the internal volume along the vertical direction and relative to (1) a position of the receiving tank and (2) the upper level of the fluid in the fluid containment tank, wherein a change of the position of the internal volume adjusts a hydraulic resistance of a path from the fluid containment tank to the outflow port of the flow controller through the internal volume.

Example embodiments of the method can include one or more of at least the following features. In some embodiments of the method, for example, the flow controller is configured to increase the flow rate when a distance between the position of the internal volume and the position of the receiving tank decreases in the vertical direction and a height between the position of the receiving tank and the upper level of the fluid in the fluid containment tank is held constant in the vertical direction. In some embodiments of the method, for example, the flow controller is configured to decrease the flow rate when a distance between the position of the internal volume and the position of the receiving tank increases in the vertical direction and a height between the position of the receiving tank and the upper level of the fluid in the fluid containment tank is held constant in the vertical direction. In some embodiments, for example, the method comprises providing the fluid from the flow controller or from the receiving tank to a water collection system fluidically coupled to the flow controller or to the receiving tank and configured to store the provided fluid and/or to route the provided fluid away from the flow controller or from the receiving tank. In some embodiments, for example, the method comprises allowing a gas to enter or exit the internal volume of the flow controller through a vent port on an outside of the flow controller leading through a vent conduit to the internal volume. In some embodiments of the method, for example, a rate of providing the fluid into the fluid containment tank is equal to or greater than a rate of providing the fluid from the fluid containment tank to the receiving tank or to the flow controller. In some embodiments of the method, for example, the controlling the flow of the fluid through the flow controller is operated by a motor that is controlled using a system programmable logic controller (PLC). In some embodiments, for example, the method comprises establishing a calibration relationship between a change in a flow rate of a fluid flow through the flow controller and a number of movements of a moveable component that moves to achieve the change in the flow rate. In some embodiments, for example, the method comprises measuring a flow rate of a fluid flow through the flow controller, comparing the measured flow rate with a pre-set flow rate value, and changing the flow rate based on the comparison outcome by controlling, through a system programmable logic controller, a motor to rotate a shaft a number of rotations determined using the calibration relationship.

In some embodiments in accordance with the present technology, a system for controlling a flow rate of a fluid includes (I) a fluid containment tank structured to enclose a first interior space to contain the fluid, the fluid containment tank comprising a first access opening to the first interior space to allow the fluid to enter the first interior space, a second access opening to the first interior space to allow the fluid to exit the first interior space, a third access opening to the first interior space to allow the fluid to exit the first interior space, and an overflow conduit fluidically coupled to the fluid containment tank at the third access opening at a first end of the overflow conduit, the overflow conduit having a portion extending from the first end into the first interior space to a second end of the overflow conduit wherein the second end of the overflow conduit provides a fourth access opening into a hollow channel within the overflow conduit, the hollow channel spanning to the first end, and wherein the overflow conduit is configured to control an upper level of the fluid contained in the fluid containment tank; (II) a receiving tank fluidically coupled to the fluid containment tank and structured to enclose a second interior space to contain the fluid, the receiving tank comprising a fifth access opening to the second interior space to allow the fluid to enter the second interior space, and a sixth access opening to the second interior space to allow the fluid to exit the second interior space; and (III) a flow controller fluidically coupled to the receiving tank and comprising an enclosure having (i) an inflow port, (ii) an outflow port, and (iii) an internal volume between the inflow port and the outflow port, wherein the inflow port is configured to allow the fluid to enter the internal volume, and wherein the outflow port is configured to allow the fluid to exit the internal volume, and an actuator assembly configured to move the enclosure along a vertical direction aligned with the direction of gravity so as to control a flow of the fluid through and out of the flow controller, wherein the flow controller is configured to control a flow rate of the fluid through the internal volume by changing a position of the internal volume relative to (1) a position of the receiving tank and (2) the upper level of the fluid in the fluid containment tank along the vertical direction, wherein a change of the position of the internal volume changes a hydraulic resistance of a path from the fluid containment tank to the outflow port of the flow controller through the internal volume.

The disclosed flow control system, method and devices can be used in a wide variety of systems for environmental and low-energy demand applications on a large, medium or small scale. In some aspects, the flow control system is used in a wastewater treatment system to control a flow of pre-treated wastewater and/or treated wastewater. For example, in some implementations, the wastewater treatment system is a bioelectrochemical system based on microbial fuel cell devices used for wastewater treatment and concomitant energy generation.

The subject matter described in this patent document can be implemented in specific ways that provide one or more of the following features.

BRIEF DESCRIPTION OF THE DRAWINGS

FIG. 6A shows a diagram of an example embodiment of a method for controlling a flow rate of a fluid flow according to the technology disclosed in the present application.

FIG. 6B shows a flowchart illustrating an example embodiment of a process for controlling fluid flow in accordance with the method shown in FIG. 6A.

DETAILED DESCRIPTION

Traditional ways of controlling flow rate of a fluid flowing through a conduit are based on utilization of mechanical elements such as pumps as the main part of a flow control system. Movable parts of such mechanical elements are generally in direct contact with the fluid, and the fluid flow is restricted or increased via changing positions or speed of the movable parts. In cases where the fluid contains considerable amounts of contamination (e.g., the fluid is wastewater), using movable parts which are in direct contact with the fluid can lead to corrosion and malfunction of the flow control system and thus disrupt or completely block the fluid flow through the conduit. In addition, available pump devices for industrial water and wastewater related systems are designed to conduct fast flow rates (e.g., hundreds and thousands of gallons per hour), are highly energy-intensive, and take up a large physical footprint. Conventional pump devices for industrial applications cannot be applied for slow flow water systems (e.g., <1 gallons per minute) with a small footprint and low energy demand, such as for a bioelectrochemical system for wastewater treatment.

Disclosed are systems, devices and methods for providing fluid flow control. In various implementations, the disclosed systems, devices and methods can control fluid flow by changing a hydraulic resistance of a fluid path from a fluid source through a conduit by changing a position of the conduit along the direction of gravity and relative to the position of the fluid source. In this manner, the disclosed fluid flow control technology can avoid using flow control pumps or similar elements. Such gravity-based flow control system can be beneficial for a variety of applications including, but not limited to, wastewater treatment installations.

Figure 1A:
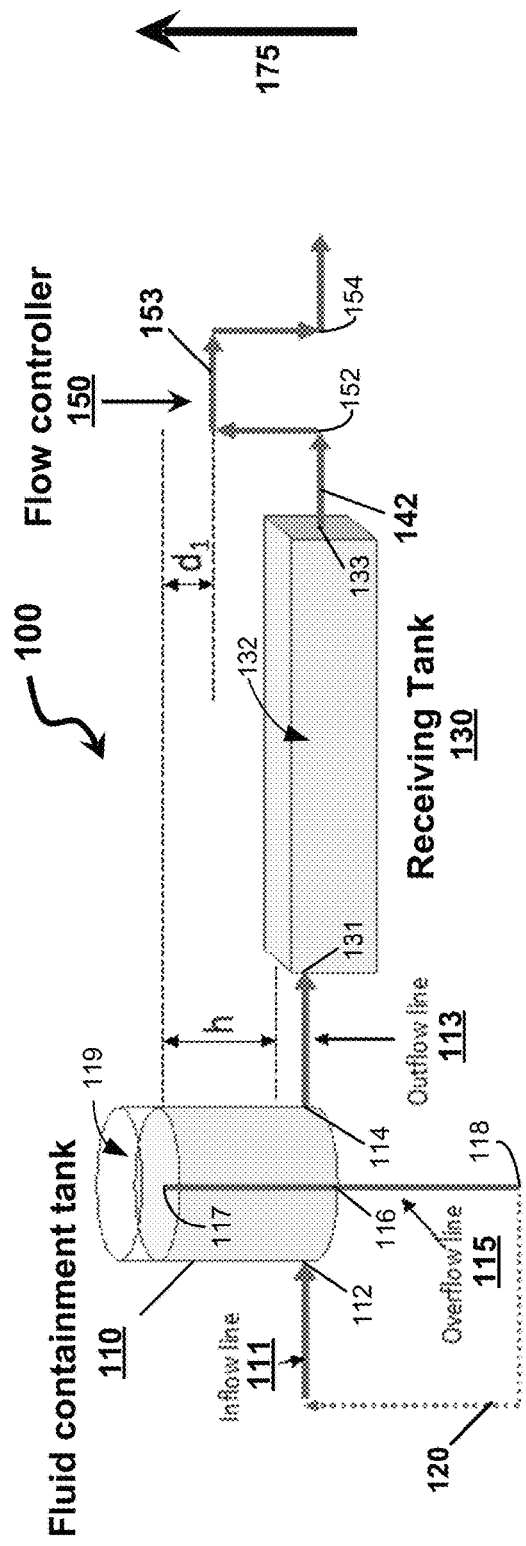
FIGS. 1A and 1B show illustrative diagrams of a gravity-based fluid flow control system in accordance with the present technology.
Figure 1B:
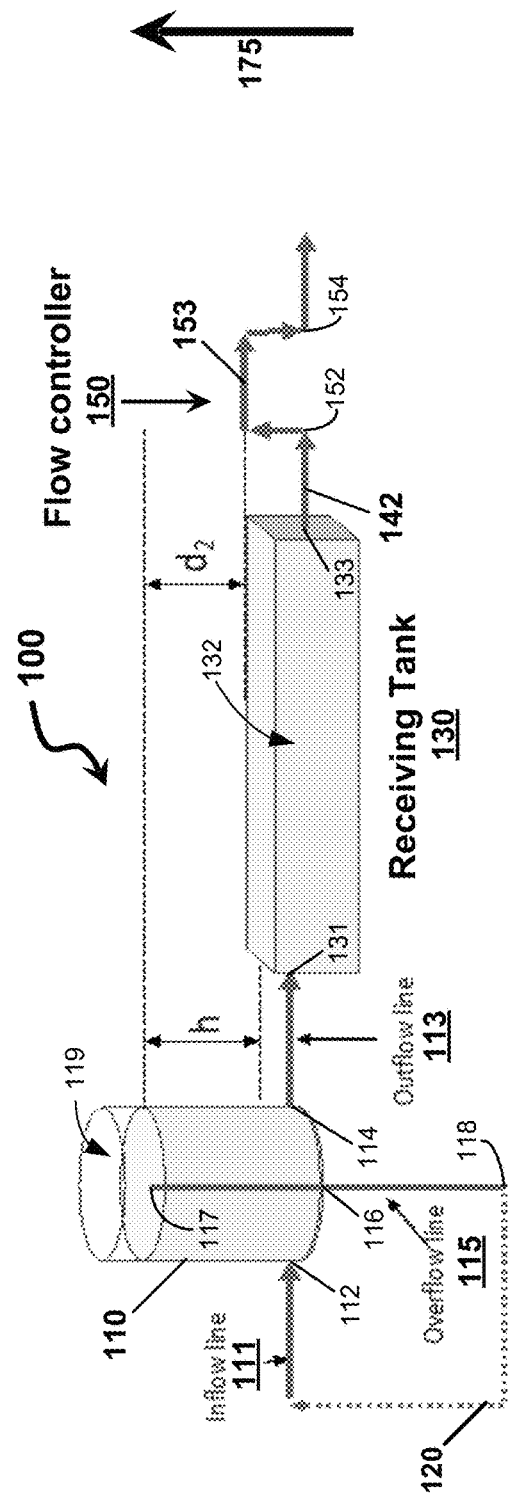

FIGS. 1A and 1B show illustrative diagrams of an example implementation of a gravity-based fluid flow control system 100 in accordance with the present technology. In the example implementation shown in FIGS. 1A and 1B, the gravity-propelled flow of a fluid (e.g., an aqueous solution such as pre-treated wastewater and/or treated wastewater in a wastewater treatment system) is provided by a fluid containment tank (FC tank) positioned above a top of a receiving body, for example, sometimes referred to as a "receiving tank" or "receiving containment tank" (RC tank), which is supplied with the fluid. The height (h) between a top level of the fluid in the fluid containment tank and the top of the receiving tank determines the hydraulic head pressure applied to the receiving tank when the receiving tank is fluidically coupled directly to the fluid containment tank, as shown, for example, in FIG. 1A.

As shown in FIG. 1A, the fluid flows from the fluid containment tank into the receiving containment tank and further flows through a flow controller and is discharged afterwards. The flow controller controls a flow rate of the fluid through and out of the flow controller and, consequently, controls a flow rate of the fluid from the fluid containment tank to the receiving tank and/or a flow rate of the fluid out of the receiving tank. Thick lighter gray arrows in FIG. 1A show directions of the fluid flow.

As illustrated in FIGS. 1A and 1B, the flow controller is installed after the receiving tank with respect to the fluid flow. Yet, the flow controller can be installed before the receiving tank with respect to the flow of the fluid. In various embodiments of the flow control system, one or more flow controllers also can be installed before the receiving tank and/or after the receiving tank. Notably, the same principle of flow control described in the present application applies irrespective of a flow controller position after the receiving tank or before the receiving tank.

The flow control principle is based on a fluid flow rate dependence on the relative difference (d) between the top level of the fluid in the fluid containment tank and a top point of the flow controller body through which the fluid flows, also depending upon the height (h) between the top level of the fluid in the fluid containment tank and the top of the receiving tank. Preferably, the height (h) is kept constant. The higher the tank fluid level-controller difference d (e.g., when h is constant), the higher the flow rate is, and vice versa.

For example, if there is no tank fluid level-controller difference (d=0), then no flow through the flow controller occurs (these are hydrostatic conditions). For example, if there is a pressure gradient (e.g., tank fluid level-controller difference d>0), then flow will occur from high pressure towards low pressure (e.g., from a higher liquid level towards a lower liquid level, which is, in the case shown in FIG. 1A, from the fluid containment tank 110 to the receiving tank 130). Also, for example, the greater the pressure gradient or height difference (through the same formation material, i.e., the material of the tank), the greater the flow rate; and the flow rate of a fluid will be different through different formation materials even if the same pressure gradient exists.

As shown in the diagrams of FIGS. 1A and 1B, the gravity-based flow control system 100 includes a fluid containment tank 110 that is structured to enclose a first interior space 119 to contain a fluid such as, for example, pre-treated wastewater during wastewater processing in a wastewater treatment system. The fluid containment tank 110 includes a first access opening 112 to the first interior space 119 to allow the fluid to enter the first interior space, and a second access opening 114 to the first interior space 119 to allow the fluid to exit the first interior space 119. An inflow line 111 is coupled to the fluid containment tank 110 at the first access opening 112 and is used to provide the fluid to the tank 110. An outflow line 113 is coupled to the tank 110 at the second access opening 114 and is used to supply the fluid from the tank 110 to other elements of the system 100.

In some embodiments, the fluid containment tank 110 includes a third access opening 116 to the first interior space 119 to allow the fluid to exit the first interior space. In such embodiments, for example, the fluid containment tank 110 also includes an overflow line 115 coupled to the tank 110 at the third access opening 116, where the overflow line 115 has a first portion extending from the third access opening 116 into the first interior space 119 to a first end 117 of the overflow line, and the overflow line has a second portion extending from the access opening 116 outside the fluid containment tank 110 to a second end 118 of the overflow line. In some embodiments, the overflow line 115 is fluidically coupled to the inflow line 111 via a line 120 to provide a return path back into the tank 110 for the fluid leaving the fluid containment tank 110 through the overflow line 115.

The gravity-based flow control system 100 also includes a receiving tank 130 which is to be supplied with the fluid and is fluidically coupled to the fluid containment tank 110. The receiving tank 130 structured to enclose a second interior space 132 to contain the fluid. The receiving tank includes a fifth access opening 131 to the second interior space 132 to allow the fluid to enter the second interior space 132, and a sixth access opening 133 to the second interior space 132 to allow the fluid to exit the second interior space 132. The receiving tank 130 is coupled to the fluid containment tank 110 through the outflow line 113, which connects to the fluid containment tank 110 at the second access opening 114 to the receiving tank 130 at the fifth access opening 131.

The gravity-based flow control system 100 also includes a flow controller 150 having an enclosure 151 (not shown in FIGS. 1A and 1B, and shown in an example embodiment in FIGS. 3A-B) and that includes (i) an inflow port 152, (ii) an outflow port 154, and (iii) an internal volume 153 of the enclosure 151 between the inflow port 152 and the outflow port 154. The inflow port 152 is configured to allow the fluid to enter the internal volume 153, and the outflow port 154 is configured to allow the fluid to exit the internal volume 153.

In various embodiments, the flow controller 150 includes an actuator assembly (not shown in FIGS. 1A and 1B, and shown in an example embodiment in FIGS. 3A-B) configured to move the enclosure 151 of the flow controller 150 along a vertical direction 175 aligned with the direction of gravity so as to control a flow of the fluid through and out of the flow controller 150.

The flow controller 150 controls flow rate of a fluid through the internal volume 153 of the flow controller by changing a position of the internal volume 153 relative to (1) a position of the receiving tank 130 and (2) an upper level of the fluid in the fluid containment tank 110 along the vertical direction 175, where a change of the position of the internal volume 153 changes a hydraulic resistance of a path from the fluid containment tank 110 to the outflow port 154 of the flow controller 150 through the internal volume 153 of the flow controller.

In some embodiments, provided the configuration of the flow rates of the fluid flows to/from the fluid containment tank 110 is as described above, the upper level of the fluid in the fluid containment tank 110 along the vertical direction 175 is the level of the first end 117 of the overflow line 115 in the interior space 119 of the tank 110.

As shown in FIGS. 1A-1B, for example, the path from the fluid containment tank 110 to the outflow port 154 of the flow controller 150 through the internal volume 153 of the flow controller can go through the outflow line 113, the receiving tank 130, and a line 142 fluidically coupled between the sixth access opening 133 of the receiving tank and the inflow port 152 of the flow controller.

Figure 2:
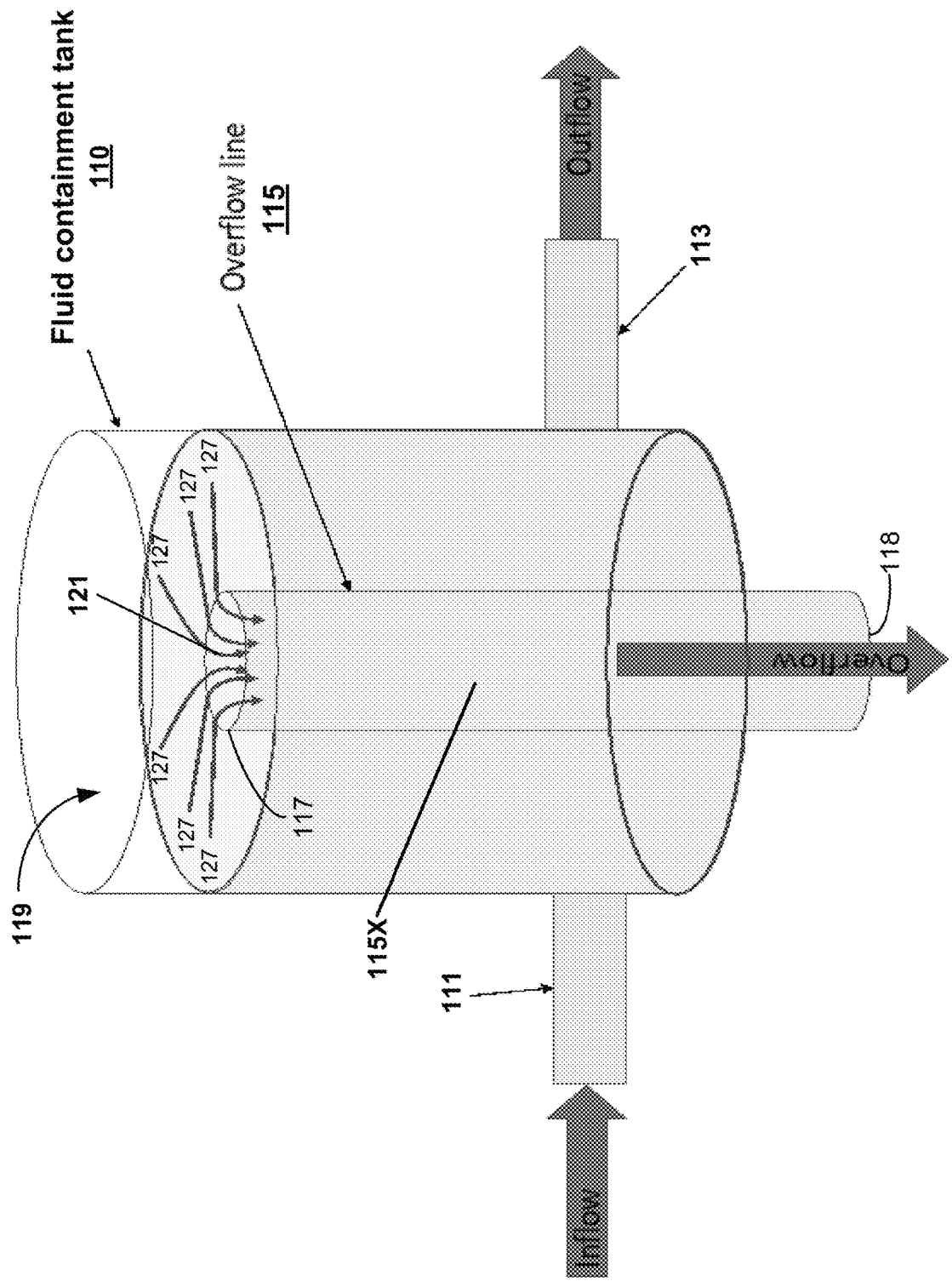
FIG. 2 shows a schematic representation of an example embodiment of a fluid containment tank and directions of the fluid flows inside the tank as well as into and out of the tank.

FIG. 2 shows a schematic representation of an example embodiment of the fluid containment tank 110 and directions of the fluid flows inside the tank as well as into and out of the tank. As shown in FIG. 2, the overflow line 115 has a hollow interior 115X within the interior of the overflow line, which spans from the first end 117 to the second end 118. As shown in this example, the overflow line includes a fourth access opening 121 into the hollow channel 115X at the first end 117. The fourth access opening provides fluid access from the first interior space 119 of the fluid containment tank 110 into the inner channel 115X of the overflow line. Arrows 127 in FIG. 2 show directions of the fluid flow from the interior space 119 of the fluid containment tank 110 into the inner channel 115X of the overflow line.

In some implementations, a rate of the fluid inflow into the fluid containment tank 110 through the inflow line 111 is equal to or greater than a rate of the fluid outflow from the fluid containment tank 110 through the outflow line 113. In example embodiments including the overflow line 115, the overflow line 115 can provide a rate of the fluid outflow from the fluid containment tank 110 which balances a difference between the rate of the fluid inflow into the fluid containment tank 110 through the inflow line 111 and the rate of the fluid outflow from the fluid containment tank 110 through the outflow line 113. Such a configuration of the flow rates of the fluid flows to/from the fluid containment tank 110 causes the top level of the fluid in the tank 110 to remain at the level of the first end 117 of the overflow line 115 in the interior space 119 of the tank 110. Consequently, the distance h between the top level of the fluid in the fluid containment tank 110 and the top of the receiving tank 130 remains constant as long as the position of the first end 117 of the overflow conduit 115 relative to the top of the receiving tank 130 does not change.

Figure 3A:
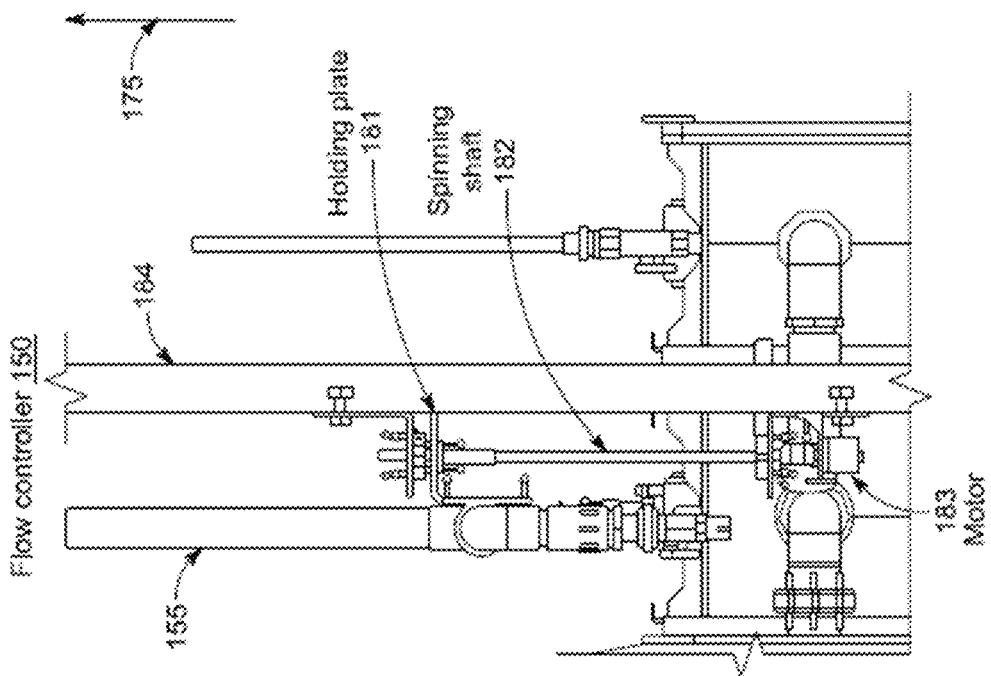
FIGS. 3A and 3B show a front (FIG. 3A) and a side (FIG. 3B) views of an example embodiment of a flow controller according to the technology disclosed in the present application.
Figure 3B:
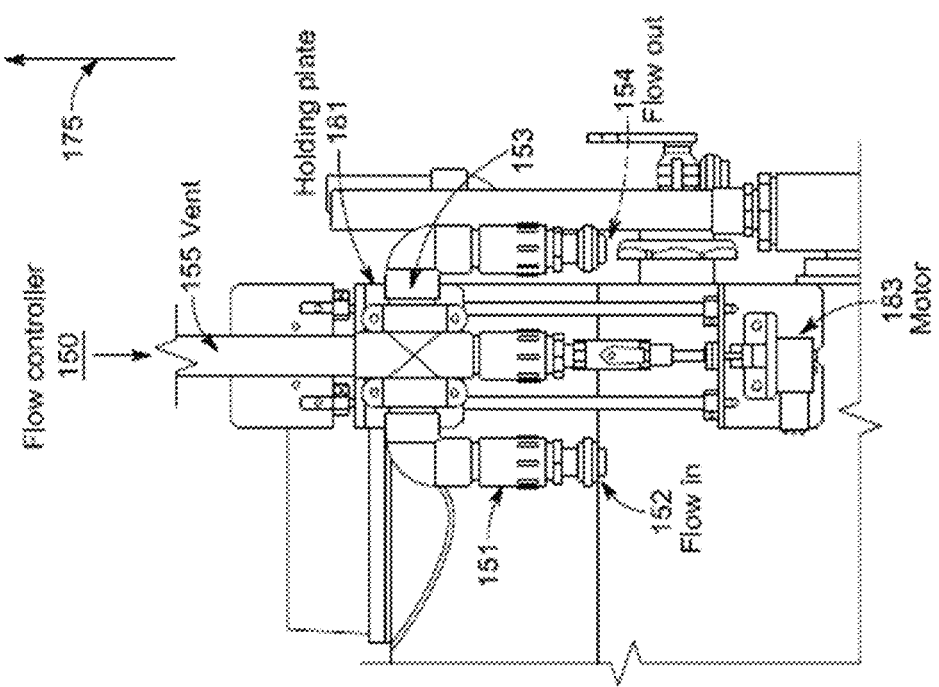

FIGS. 3A and 3B show a front (FIG. 3A) and a side (FIG. 3B) views of an example embodiment of the flow controller 150 of the system 100. In the example embodiment, the enclosure 151 of the flow controller 150 includes a piping or tubular enclosure. For example, in some embodiments, the actuator assembly of the flow controller 150 includes a holding plate 181 coupled to the example of the enclosure 151; the actuator assembly includes a shaft 182 (shown in FIG. 3B) coupled to the holding plate 181 and aligned in the vertical direction 175; and the actuator assembly includes a motor 183 operatively coupled to the shaft 182 to cause the shaft 182 to move so as to drive the holding plate 181 to move in the vertical direction 175. The actuator assembly includes a control module that includes a data processing unit, comprising one or more processors, memory and interface unit. In various implementations, the control module is in communication with the motor to control the motor to drive the components of the flow controller 150. In some embodiments, the shaft 182 includes a spinning shaft that rotates about an axis aligned in the vertical direction 175. In some embodiments, the actuator assembly is coupled to a post 184 (shown in FIG. 3B) aligned in the vertical direction 175 and configured to support the actuator assembly.

In some embodiments of the flow controller 150, the enclosure 151 of the flow controller 150 comprises a vent port configured to allow a gas to enter or exit the internal volume 153, and the flow controller 150 comprises a vent conduit 155 coupled to the enclosure 151 at the vent port at a first end of the vent conduit, the vent conduit having a portion extending from the first end along the vertical direction 175 to a second end of the vent conduit, wherein the vent conduit is configured to route the gas through the vent conduit between the first end of the vent conduit and the second end of the vent conduit into the flow controller 150 or out of the flow controller 150.

In some implementations, the flow controller 150 is configured in an inverse U-like shape, such that the inflow port 152 and the outflow port 154 are lower in the vertical direction 175 than the interior volume 153, as shown in FIG. 3A.

Various materials including plastic, fiberglass or metal pipe can be used to make elements of the flow controller 150.

The gravity-based fluid flow control system 100 can be implemented in a variety of applications for controlling fluid flow in a system. One such system includes a bioelectrochemical system for wastewater treatment.

Figure 4:
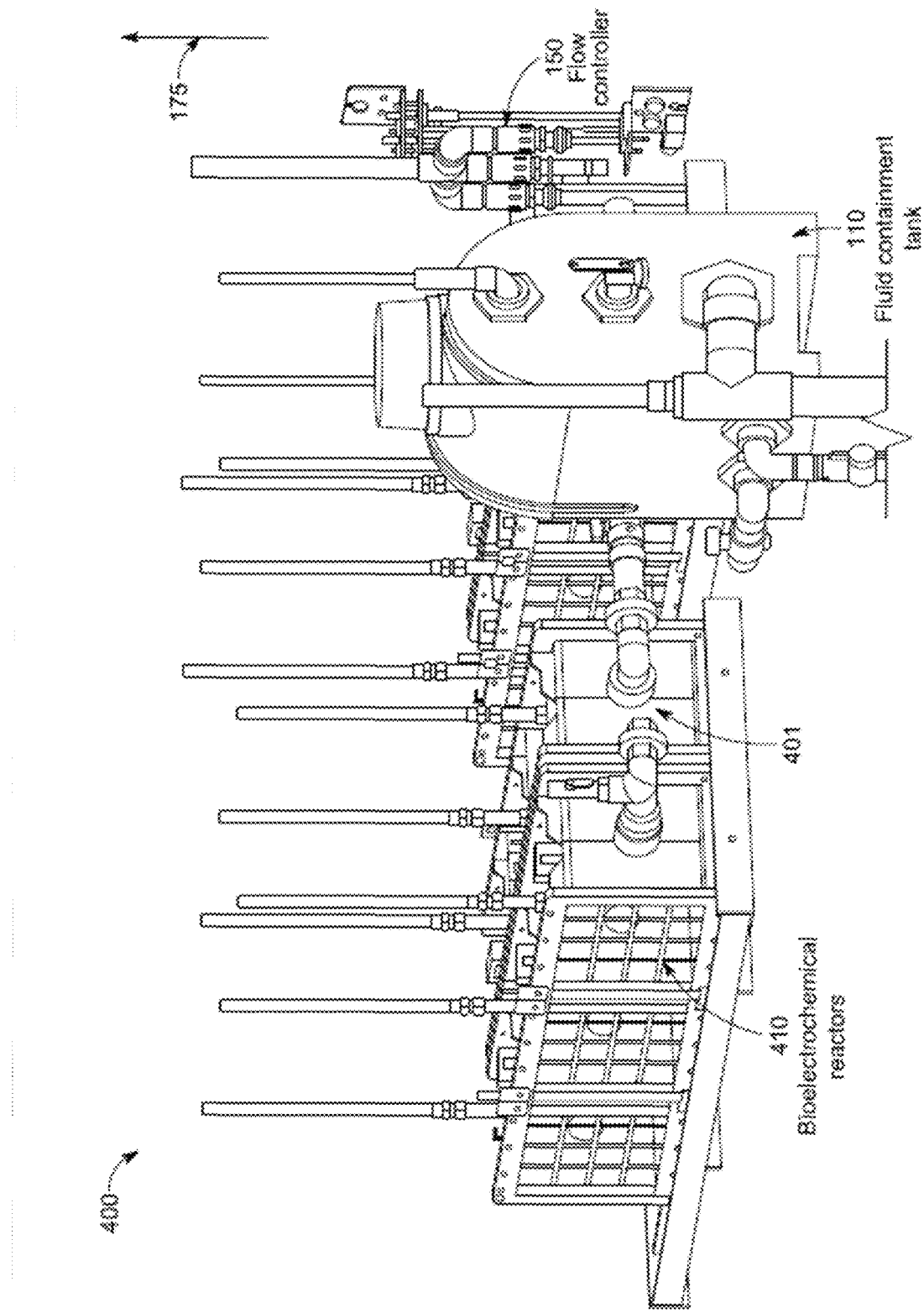
FIG. 4 shows an illustrative diagram of an example embodiment of a bioelectrochemical system for wastewater treatment which uses a gravity-based fluid flow control system in accordance with the present technology.

FIG. 4 shows an illustrative diagram of an example embodiment of a bioelectrochemical system for wastewater treatment 400 which uses an example embodiment of the gravity-based fluid flow control system 100. In this example, the receiving tank 130 is replaced with one or more bioelectrochemical reactors 410 (e.g., microbial fuel cell (MFC) devices) arranged in hydraulic series in one horizontal plane. The fluid flows from the fluid containment tank 110 into a first bioelectrochemical reactor, then a second reactor and so on until it leaves the bioelectrochemical reactors and flows through the flow controller 150. The wastewater level in the fluid containment tank 110 is controlled above the level of the bioelectrochemical reactors 410 to provide the gravity flow control.

Various embodiments of the wastewater treatment system and bioelectrochemical reactors, e.g., including a microbial fuel cell (MFC) device, are described in U.S. Patent Publication No. 2020/0002200A1, which is incorporated by reference as part of this patent disclosure for all purposes.

In some embodiments, a wastewater treatment system includes a wastewater pretreatment system configured to pre-treat wastewater by removing at least some solid particles from the wastewater to produce a pre-treated wastewater. The wastewater treatment system includes a wastewater containment tank (e.g., such as fluid containment tank 110 of FIGS. 1A and 1B), which is fluidically coupled to the wastewater pretreatment system and structured to enclose an interior space (e.g., interior space 119 of tank 110) to contain the pre-treated wastewater. The wastewater containment tank includes a first access opening to the interior space to allow the pre-treated wastewater to enter the interior space, and a second access opening to the interior space to allow the pre-treated wastewater to exit the interior space. The wastewater treatment system includes a microbial fuel cell device (e.g., such as MFC device 401 shown in FIG. 4) fluidically coupled to the wastewater containment tank, the MFC device having an input port to allow the pre-treated wastewater to enter the MFC device, and the MFC device is operable to bioelectrochemically process the pre-treated wastewater by concurrently generating electrical energy and digesting matter in the pre-treated wastewater to yield a treated water that is outputted out of an output port of the MFC device. The wastewater treatment system includes an embodiment of the flow control system 100 fluidically coupled to the MFC device, where the flow control system is configured to control a flow rate of the fluid through the internal volume by changing a position of the internal volume relative to (1) a position of the MFC device and (2) an upper level of the pre-treated wastewater in the wastewater containment tank along the vertical direction, wherein a change of the position of the internal volume changes a hydraulic resistance of a path from the wastewater containment tank to the outflow port of the flow control system through the internal volume.

In some implementations, adjustment of a position of the enclosure 151 of the flow controller 150 in the vertical direction 175 can be done manually or it can be done remotely and/or in an automated fashion using the actuator assembly described above. For example, the operation of the motor 183 of the actuator assembly can be controlled using a programmable logic controller (PLC) and a user interface (UI).

Figure 5:
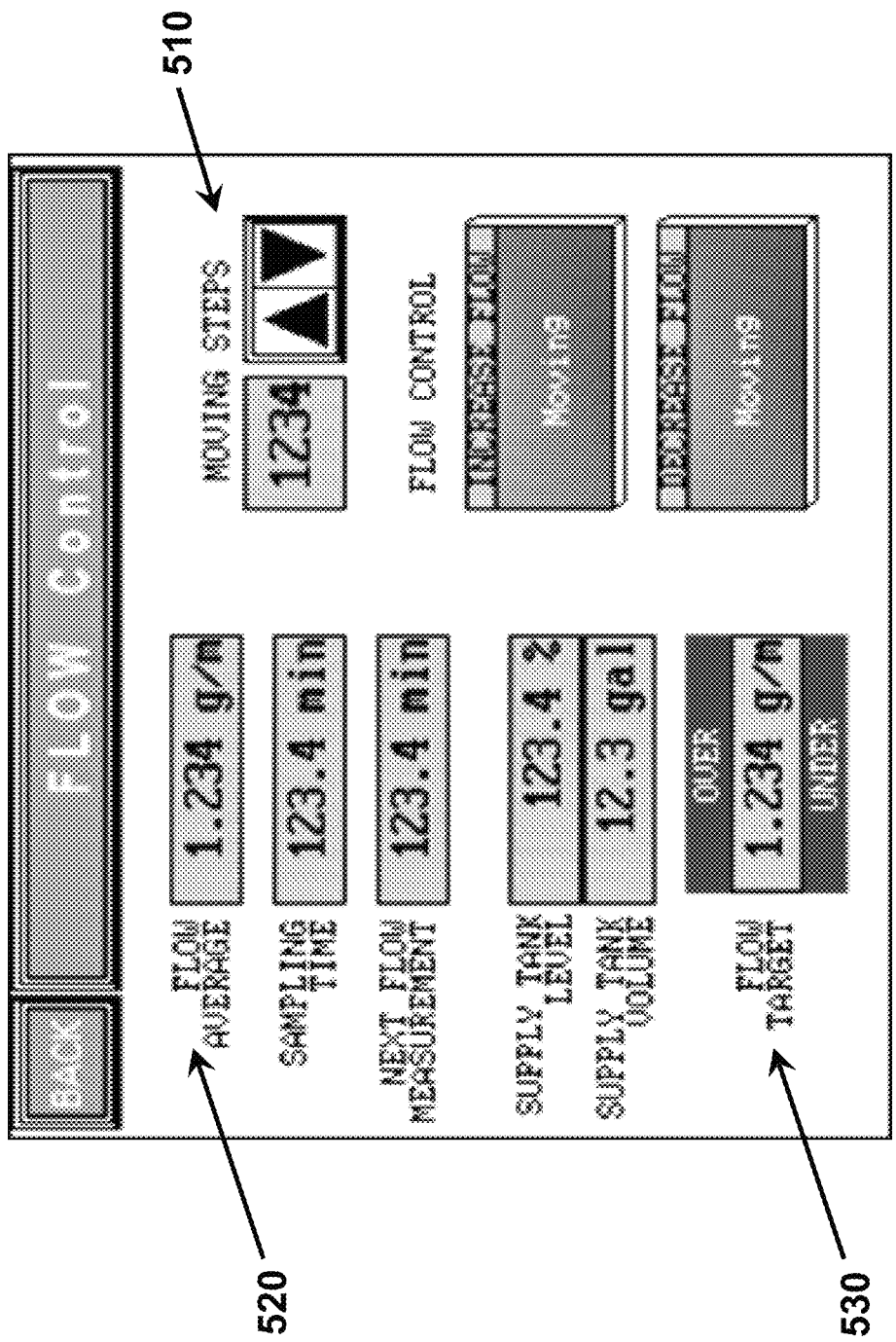
FIG. 5 shows a diagram illustrating an example user interface for a flow control menu of a gravity-based fluid flow control system in accordance with the present technology.

FIG. 5 shows a diagram depicting an example flow control menu of a graphical user interface (GUI) that allows performing adjustments of the flow rate of a fluid through the flow controller. The GUI shows a moving steps control 510 of the Flow Control menu, which controls how many tracked movements of the actuator assembly of the flow controller 150 as it moves the enclosure (e.g., rotations of the spinning shaft 182 in the example shown in FIGS. 3A-3B to move the holding plate 181 in a given direction ("up" or "down") along the vertical direction 175).

A relationship between a change in a flow rate of a fluid through the flow controller 150 and the numeric value entered into the moving steps control 510 can be determined using a flow controller calibration procedure. For example, in a bioelectrochemical system for wastewater treatment composed of twelve reactors in hydraulic series, e.g., as shown in the example of FIG. 4, which flowing clean water, rotating the spinning shaft 182 with 30 moving steps to move the internal volume 153 of the flow controller 150 up or down, changes the flow rate with 0.03±0.01 gpm. Calibration is needed for every system and type of liquid flowing through it.

The GUI includes a flow average indicator 520 indicative of a measurement of an average fluid flow through the flow controller 150. In some implementations of the flow controller, for example, the flow control can be done automatically. The average flow rate of a fluid (520 in FIG. 5) through the flow controller 150 or through some other location fluidically coupled to the flow controller (such as, for example, through the outflow line 113 shown in FIG. 1) can be measured and compared to a flow target indicator (530 in FIG. 5). The flow target is the desired flow rate for the flow control system 100. When the flow average deviates from the flow target by more than a preset amount, the PLC of the system adjusts the position of the holding plate 181 automatically, using a number of moving steps obtained from the results of the flow controller calibration procedure, to adjust the flow rate until the flow rate is within a pre-determined range from the target flow rate value.

FIG. 6A shows a diagram of an example embodiment of a method 600 for controlling a flow rate of a fluid. At process 610, the method 600 includes providing a fluid to a fluid containment tank. At process 620, the method 600 includes providing the fluid from the fluid containment tank to a receiving tank. At process 630, the method 600 includes controlling a flow of the fluid through a flow controller fluidically coupled to the receiving tank. In various implementations of the method 600, the processes 610-630 can be performed in a sequence or in parallel.

The method 600 can be implemented, for example, using elements and structures of the flow control system 100 described above. For example, the fluid containment tank of process 610 can be the fluid containment tank 110 of the flow control system 100, the receiving tank of process 620 can be the receiving tank 130 of the flow control system 100, and the flow controller of process 630 can be the flow controller 150 of the flow control system 100.

In some implementations of the method 600, a rate of providing the fluid into the fluid containment tank is equal to or greater than a rate of providing the fluid from the fluid containment tank to the receiving tank. As describe above in relation to the flow control system 100, such relationship between the flow rates allows keeping the highest level of the fluid in the fluid containment tank constant such that the flow rate of a fluid flow in the system 100 is controlled by adjusting just a position of an internal volume of a flow control mechanism fluidically coupled to the receiving tank along a vertical direction aligned with the direction of gravity.

FIG. 6B shows a flow chart of an example embodiment of the process 630 of the method 600. At process 631 of the process 630, the process 630 includes measuring flow rate of a flow of the fluid through the flow controller. At process 632 of the process 630, the process 630 comparing the measured flow rate value to a target flow rate value. At process 633 of the process 630, the process 633 changing a position of an internal volume of the flow controller along a vertical direction based on a result of the comparison.

In some implementations, the process 630 can involve using a flow controller, which can include an enclosure having (i) an inflow port, (ii) an outflow port, and (iii) an internal volume between the inflow port and the outflow port, where the inflow port is configured to allow the fluid to enter the internal volume, and the outflow port is configured to allow the fluid to exit the internal volume, and where the flow controller includes an actuator assembly configured to move the enclosure along a vertical direction aligned with the direction of gravity so as to control a flow of the fluid through and out of the flow controller.

In some implementations of the process 633, changing a position of the internal volume of the flow controller along the vertical direction is done using the actuator assembly, where the actuator assembly can include a holding plate coupled to the enclosure of the flow controller; a shaft coupled to the holding plate and aligned in the vertical direction; and a motor operatively coupled to the shaft to cause the shaft to move so as to drive the holding plate to move in the vertical direction.

In some implementations of the process 633, operation of the motor of the actuator assembly is controlled using a programmable logic controller (PLC).

In some implementations of the process 633, the process 633 includes establishing a calibration relationship between a change in flow rate of a fluid flow through the flow controller and a number of rotations of the spinning shaft required to achieve the change in the flow rate.

In some implementations of the process 633, changing a position of the internal volume of the flow controller along the vertical direction based on the comparison outcome includes controlling, through the PLC, the motor to rotate the spinning shaft a number of rotations determined using the calibration relationship.

As discussed above with respect to the various embodiments of the devices, systems, and method for controlling fluid flow, e.g., for water treatment applications, the fluid flow control can be implemented using such devices, systems, and methods without the requirement of a pump. The disclosed devices, systems, and methods are structured to utilize gravitational forces to sufficiently drive and control the fluid flow, where an actuator device may be employed to move structures of the disclosed fluid flow control devices and systems, in some embodiments, to manage such fluid drive and flow control. Yet, it is noted, in some embodiments in accordance with the present technology, a pump (e.g., peristaltic pump [not shown]) may be used for further assistance with the disclosed fluid flow control devices and systems. While the disclosed fluid flow control devices and systems are capable of fluid flow control with a degree of accuracy that may be within a range of tenths of g/m flow averages, the use of a pump coupled to the fluid flow control device and system can further improve on accuracy, e.g., particularly when greater accuracy is needed (e.g., precision in the hundredths, or thousandths) and/or when the flow is for substantially smaller volumes of fluid flow.

EXAMPLES

The following examples are illustrative of several embodiments of the present technology. Other exemplary embodiments of the present technology may be presented prior to the following listed examples, or after the following listed examples.

In some embodiments in accordance with the present technology (example A1), a system for energy generation and wastewater treatment includes a wastewater pretreatment system to pre-treat wastewater by removing at least some solid particles from the wastewater and produce a pre-treated wastewater; a wastewater containment tank fluidically coupled to the wastewater pretreatment system and structured to enclose an interior space to contain the pre-treated wastewater, the wastewater containment tank comprising a first access opening to the interior space to allow the pre-treated wastewater to enter the interior space, and a second access opening to the interior space to allow the pre-treated wastewater to exit the interior space; a microbial fuel cell (MFC) device fluidically coupled to the wastewater containment tank, the MFC device having an input port to allow the pre-treated wastewater to enter the MFC device, and the MFC device is operable to bioelectrochemically process the pre-treated wastewater by concurrently generating electrical energy and digesting matter in the pre-treated wastewater to yield a treated water that is outputted out of an output port of the MFC device; and a flow control system fluidically coupled to the MFC device, where the flow control system comprises an enclosure having (i) an inflow port, (ii) an outflow port, and (iii) an internal volume between the inflow port and the outflow port, the inflow port providing a third access opening to the internal volume to allow a fluid to enter the internal volume, and the outflow port providing a fourth access opening to the internal volume to allow the fluid to exit the internal volume, and an actuator assembly configured to move the enclosure along a vertical direction aligned with the direction of gravity so as to control a flow of the fluid through and out of the flow control system, wherein the flow control system is configured to control a flow rate of the fluid through the internal volume by changing a position of the internal volume relative to (1) a position of the MFC device and (2) an upper level of the pre-treated wastewater in the wastewater containment tank along the vertical direction, wherein a change of the position of the internal volume changes a hydraulic resistance of a path from the wastewater containment tank to the outflow port of the flow control system through the internal volume.

Example A2 includes the system of example A1 or any of examples A1-A16, wherein the wastewater containment tank comprises: a fifth access opening to the interior space, and an overflow conduit coupled to the wastewater containment tank at the fifth access opening at a first end of the overflow conduit, the overflow conduit having a portion extending from the first end into the interior space of the wastewater containment tank to a second end of the overflow conduit, wherein the second end of the overflow conduit provides a sixth access opening into a hollow channel within the overflow conduit, the hollow channel spanning to the first end, and wherein the overflow conduit is configured to control the upper level of the pre-treated wastewater contained in the wastewater containment tank.

Example A3 includes the system of example A1 or any of examples A1-A16, wherein the second access opening of the wastewater containment tank is fluidically coupled to the input port of the MFC device.

Example A4 includes the system of example A1 or any of examples A1-A16, wherein the inflow port of the flow control system is fluidically coupled to the output port of the MFC device.

Example A5 includes the system of example A1 or any of examples A1-A16, wherein the second access opening of the wastewater containment tank is fluidically coupled to the inflow port of the flow control system.

Example A6 includes the system of example A1 or any of examples A1-A16, wherein the outflow port of the flow control system is fluidically coupled to the input port of the MFC device.

Example A7 includes the system of example A1 or any of examples A1-A16, wherein the enclosure of the flow control system is configured in an inverse U-like shape such that the inflow port and the outflow port are lower in the vertical direction than the interior volume.

Example A8 includes the system of example A1 or any of examples A1-A16, wherein the actuator assembly comprises: a holding plate coupled to the enclosure; a shaft coupled to the holding plate and aligned in the vertical direction; and a motor operatively coupled to the shaft to cause the shaft to move so as to drive the holding plate to move in the vertical direction.

Example A9 includes the system of example A8 or any of examples A1-A16, wherein the shaft rotates about an axis aligned in the vertical direction.

Example A10 includes the system of example A1 or any of examples A1-A16, wherein the actuator assembly is coupled to a post aligned in the vertical direction and configured to support the actuator assembly.

Example A11 includes the system of example A1 or any of examples A1-A16, wherein the flow control system is configured to increase the flow rate when a distance between the position of the internal volume and the position of the MFC device decreases in the vertical direction and a height between the position of the MFC device and the upper level of the pre-treated wastewater in the wastewater containment tank is held constant in the vertical direction.

Example A12 includes the system of example A1 or any of examples A1-A16, wherein the flow control system is configured to decrease the flow rate when a distance between the position of the internal volume and the position of the MFC device increases in the vertical direction and a height between the position of the MFC device and the upper level of the pre-treated wastewater in the wastewater containment tank is held constant in the vertical direction.

Example A13 includes the system of example A1 or any of examples A1-A16, comprising a water collection system fluidically coupled to the flow control system or to the MFC device and configured to store the treated water and/or route the treated water received by the water collection system from the flow control system or from the MFC device.

Example A14 includes the system of example A1 or any of examples A1-A16, wherein the MFC device comprises a housing and a bioelectrochemical reactor that is encased within the housing, wherein the bioelectrochemical reactor includes at least one anode arranged between cathodes of a cathode assembly.

Example A15 includes the system of example A1 or any of examples A1-A16, wherein the flow control system comprises a vent port providing a seventh access opening to the internal volume to allow a gas to enter or exit the internal volume, and a vent conduit fluidically coupled to the flow control system at the vent port at a first end of the vent conduit, the vent conduit having a portion extending from the first end of the vent conduit along the vertical direction to a second end of the vent conduit, wherein the vent conduit is configured to route the gas through the vent conduit between the first end of the vent conduit and the second end of the vent conduit into the flow control system or out of the flow control system.

Example A16 includes the system of example A1 or any of examples A1-A15, wherein the fifth access opening of the wastewater containment tank is fluidically coupled to the first access opening of the wastewater containment tank.

In some embodiments in accordance with the present technology (example A17), a method of wastewater treatment and energy generation includes pretreating a wastewater using a wastewater pretreatment system by removing at least some of solid particles from the wastewater to produce a pre-treated wastewater; providing the pre-treated wastewater from the wastewater pretreatment system to a wastewater containment tank fluidically coupled to the wastewater pretreatment system and structured to enclose an interior space to contain the pre-treated wastewater, the wastewater containment tank comprising a first access opening to the interior space to allow the pre-treated wastewater to enter the interior space, and a second access opening to the interior space to allow the pre-treated wastewater to exit the interior space; providing the pre-treated wastewater from the wastewater containment tank to a microbial fuel cell (MFC) device fluidically coupled to the wastewater containment tank, the MFC device comprising an input port to allow the pre-treated wastewater to enter the MFC device, and an output port to allow a treated water to exit the MFC device, wherein the MFC device is operable to bioelectrochemically process the pre-treated wastewater by concurrently generating electrical energy and digesting matter in the pre-treated wastewater to yield the treated water; and controlling a flow of at least one of the pre-treated wastewater or the treated water through a flow control system fluidically coupled to the MFC device, the flow control system comprising an enclosure having (i) an inflow port, (ii) an outflow port, and (iii) an internal volume between the inflow port and the outflow port, the inflow port providing a third access opening to the internal volume to allow a fluid to enter the internal volume, and the outflow port providing a fourth access opening to the internal volume to allow the fluid to exit the internal volume, and an actuator assembly configured to move the enclosure along a vertical direction aligned with the direction of gravity so as to control a flow of the fluid through and out of the flow control system, wherein the flow control system is configured to control a flow rate of the fluid through the internal volume by changing a position of the internal volume relative to (1) a position of the MFC device and (2) an upper level of the pre-treated wastewater in the wastewater containment tank along the vertical direction, wherein a change of the position of the internal volume changes a hydraulic resistance of a path from the wastewater containment tank to the outflow port of the flow control system through the internal volume.

Example A18 includes the method as in example A17 or any of examples A17-A36, wherein the wastewater containment tank includes a fifth access opening to the interior space, and an overflow conduit coupled to the wastewater containment tank at the fifth access opening at a first end of the overflow conduit, the overflow conduit having a portion extending from the first end into the interior space of the wastewater containment tank to a second end of the overflow conduit, wherein the second end of the overflow conduit provides a sixth access opening into a hollow channel within the overflow conduit, the hollow channel spanning to the first end, and wherein the overflow conduit is configured to control the upper level of the pre-treated wastewater contained in the wastewater containment tank.

Example A19 includes the method as in example A17 or any of examples A17-A36, wherein the second access opening of the wastewater containment tank is fluidically coupled to the input port of the MFC device.

Example A20 includes the method as in example A17 or any of examples A17-A36, wherein the inflow port of the flow control system is fluidically coupled to the output port of the MFC device.

Example A21 includes the method as in example A17 or any of examples A17-A36, wherein the second access opening of the wastewater containment tank is fluidically coupled to the inflow port of the flow control system.

Example A22 includes the method as in example A17 or any of examples A17-A36, wherein the outflow port of the flow control system is fluidically coupled to the input port of the MFC device.

Example A23 includes the method as in example A17 or any of examples A17-A36, wherein the enclosure of the flow control system is configured in an inverse U-like shape such that the inflow port and the outflow port are lower in the vertical direction than the interior volume.

Example A24 includes the method as in example A17 or any of examples A17-A36, wherein the actuator assembly includes a holding plate coupled to the enclosure; a shaft coupled to the holding plate and aligned in the vertical direction; and a motor operatively coupled to the shaft to cause the shaft to move so as to drive the holding plate to move in the vertical direction.

Example A25 includes the method as in example A24 or any of examples A17-A36, wherein the shaft rotates about an axis aligned in the vertical direction.

Example A26 includes the method as in example A17 or any of examples A17-A36, wherein the actuator assembly is coupled to a post aligned in the vertical direction and configured to support the actuator assembly.

Example A27 includes the method as in example A17 or any of examples A17-A36, wherein the flow control system is configured to increase the flow rate when a distance between the position of the internal volume and the position of the MFC device decreases in the vertical direction and a height between the position of the MFC device and the upper level of the pre-treated wastewater in the wastewater containment tank is held constant in the vertical direction.

Example A28 includes the method as in example A17 or any of examples A17-A36, wherein the flow control system is configured to decrease the flow rate when a distance between the position of the internal volume and the position of the MFC device increases in the vertical direction and a height between the position of the MFC device and the upper level of the pre-treated wastewater in the wastewater containment tank is held constant in the vertical direction.

Example A29 includes the method as in example A17 or any of examples A17-A36, including providing the treated water from the flow control system or from the MFC device to a water collection system fluidically coupled to the flow control system or to the MFC device and configured to store the provided treated water and/or route the provided treated water.

Example A30 includes the method as in example A17 or any of examples A17-A36, wherein the MFC device comprises a housing and a bioelectrochemical reactor that is encased within the housing, wherein the bioelectrochemical reactor includes at least one anode arranged between cathodes of a cathode assembly.

Example A31 includes the method as in example A17 or any of examples A17-A36, wherein the flow control system comprises a vent port providing a seventh access opening to the internal volume to allow a gas to enter or exit the internal volume, and a vent conduit fluidically coupled to the flow control system at the vent port at a first end of the vent conduit, the vent conduit having a portion extending from the first end of the vent conduit along the vertical direction to a second end of the vent conduit, wherein the vent conduit is configured to route the gas into the flow control system or out of the flow control system through the vent conduit.

Example A32 includes the method as in example A17 or any of examples A17-A36, wherein a rate of providing the pre-treated wastewater from the wastewater pretreatment system to the wastewater containment tank is equal to or greater than a rate of providing the pre-treated wastewater from the wastewater containment tank to the MFC device or to the flow control system.

Example A33 includes the method as in example A17 or any of examples A17-A36, wherein the fifth access opening of the wastewater containment tank is fluidically coupled to the first access opening of the wastewater containment tank to provide a return path of the pre-treated wastewater outputted from the wastewater containment tank through the overflow conduit back into the wastewater containment tank.

Example A34 includes the method as in example A17 or any of examples A17-A36, wherein operation of the motor is controlled using a system programmable logic controller (PLC).

Example A35 includes the method as in example A17 or any of examples A17-A36, comprising establishing a calibration relationship between a change in a flow rate of a fluid flow through the flow controller and a number of rotations of the spinning shaft required to achieve the change in the flow rate.

Example A36 includes the method as in example A17 or any of examples A17-A35, comprising measuring a flow rate of a fluid flow through the flow controller, comparing the measured flow rate with a pre-set flow rate value, and changing the flow rate based on the comparison outcome by controlling, through the system programmable logic controller, the motor to rotate the spinning shaft a number of rotations determined using the calibration relationship.

In some embodiments in accordance with the present technology (example A37), a system for controlling a flow rate of a fluid includes a fluid containment tank structured to enclose a first interior space to contain the fluid, the fluid containment tank comprising a first access opening to the first interior space to allow the fluid to enter the first interior space, a second access opening to the first interior space to allow the fluid to exit the first interior space, a third access opening to the first interior space to allow the fluid to exit the first interior space, and an overflow conduit fluidically coupled to the fluid containment tank at the third access opening at a first end of the overflow conduit, the overflow conduit having a portion extending from the first end into the first interior space to a second end of the overflow conduit wherein the second end of the overflow conduit provides a fourth access opening into a hollow channel within the overflow conduit, the hollow channel spanning to the first end, and wherein the overflow conduit is configured to control an upper level of the fluid contained in the fluid containment tank; a receiving tank fluidically coupled to the fluid containment tank and structured to enclose a second interior space to contain the fluid, the receiving tank comprising a fifth access opening to the second interior space to allow the fluid to enter the second interior space, and a sixth access opening to the second interior space to allow the fluid to exit the second interior space; and a flow controller fluidically coupled to the receiving tank and comprising an enclosure having (i) an inflow port, (ii) an outflow port, and (iii) an internal volume between the inflow port and the outflow port, wherein the inflow port is configured to allow the fluid to enter the internal volume, and wherein the outflow port is configured to allow the fluid to exit the internal volume, and an actuator assembly configured to move the enclosure along a vertical direction aligned with the direction of gravity so as to control a flow of the fluid through and out of the flow controller, wherein the flow controller is configured to control a flow rate of the fluid through the internal volume by changing a position of the internal volume relative to (1) a position of the receiving tank and (2) the upper level of the fluid in the fluid containment tank along the vertical direction, wherein a change of the position of the internal volume changes a hydraulic resistance of a path from the fluid containment tank to the outflow port of the flow controller through the internal volume.

Example A38 includes the system of example A37 or any of examples A37-A50, wherein the second access opening of the fluid containment tank is fluidically coupled to the fifth access opening of the receiving tank.

Example A39 includes the system of example A37 or any of examples A37-A50, wherein the inflow port of the flow controller is fluidically coupled to the receiving tank at the sixth access opening.

Example A40 includes the system of example A37 or any of examples A37-A50, wherein the second access opening of the fluid containment tank is fluidically coupled to the inflow port of the flow controller.

Example A41 includes the system of example A37 or any of examples A37-A50, wherein the outflow port of the flow controller is fluidically coupled to the receiving tank at the fifth access opening.

Example A42 includes the system of example A37 or any of examples A37-A50, wherein the enclosure of the flow controller is configured in an inverse U-like shape such that the inflow port and the outflow port are lower in the vertical direction than the interior volume.

Example A43 includes the system of example A37 or any of examples A37-A50, wherein the actuator assembly includes a holding plate coupled to the enclosure; a shaft coupled to the holding plate and aligned in the vertical direction; and a motor operatively coupled to the shaft to cause the shaft to move so as to drive the holding plate to move in the vertical direction.

Example A44 includes the system of example A43 or any of examples A37-A50, wherein the shaft rotates about an axis aligned in the vertical direction.

Example A45 includes the system of example A37 or any of examples A37-A50, wherein the actuator assembly is coupled to a post aligned in the vertical direction and configured to support the actuator assembly.

Example A46 includes the system of example A37 or any of examples A37-A50, wherein the flow controller is configured to increase the flow rate when a distance between the position of the internal volume and the position of the receiving tank decreases in the vertical direction and a height between the position of the receiving tank and the upper level of the fluid in the fluid containment tank is held constant in the vertical direction.

Example A47 includes the system of example A37 or any of examples A37-A50, wherein the flow controller is configured to decrease the flow rate when a distance between the position of the internal volume and the position of the receiving tank increases in the vertical direction and a height between the position of the receiving tank and the upper level of the fluid in the fluid containment tank is held constant in the vertical direction.

Example A48 includes the system of example A37 or any of examples A37-A50, including a water collection system fluidically coupled to the flow controller or to the receiving tank and configured to store the fluid received by the water collection system from the flow controller or from the receiving tank and/or route the fluid received by the water collection system from the flow controller or from the receiving tank away from the flow controller or from the receiving tank.

Example A49 includes the system of example A37 or any of examples A37-A50, wherein the flow controller comprises a vent port configured to allow a gas to enter or exit the internal volume, and a vent conduit coupled to the flow controller at the vent port at a first end of the vent conduit, the vent conduit having a portion extending from the first end of the vent conduit along the vertical direction to a second end of the vent conduit, wherein the vent conduit is configured to route the gas through the vent conduit between the first end of the vent conduit and the second end of the vent conduit into the flow controller or out of the flow controller.

Example A50 includes the system of example A37 or any of examples A37-A50, wherein the third access opening of the fluid containment tank is fluidically coupled to the first access opening of the fluid containment tank.

In some embodiments in accordance with the present technology (example A51), a method of controlling a fluid flow rate includes providing a fluid to a fluid containment tank structured to enclose a first interior space to contain the fluid; providing the fluid from the fluid containment tank to a receiving tank fluidically coupled to the fluid containment tank and structured to enclose a second interior space to contain the fluid; and controlling a flow of the fluid through a flow controller fluidically coupled to the receiving tank by changing a position of the internal volume along the vertical direction and relative to (1) a position of the receiving tank and (2) the upper level of the fluid in the fluid containment tank, wherein a change of the position of the internal volume adjusts a hydraulic resistance of a path from the fluid containment tank to the outflow port of the flow controller through the internal volume.

Example A52 includes the method of example A51 or any of examples A51-A59, wherein the flow controller is configured to increase the flow rate when a distance between the position of the internal volume and the position of the receiving tank decreases in the vertical direction and a height between the position of the receiving tank and the upper level of the fluid in the fluid containment tank is held constant in the vertical direction.

Example A53 includes the method of example A51 or any of examples A51-A59, wherein the flow controller is configured to decrease the flow rate when a distance between the position of the internal volume and the position of the receiving tank increases in the vertical direction and a height between the position of the receiving tank and the upper level of the fluid in the fluid containment tank is held constant in the vertical direction.

Example A54 includes the method of example A51 or any of examples A51-A59, the method comprising providing the fluid from the flow controller or from the receiving tank to a water collection system fluidically coupled to the flow controller or to the receiving tank and configured to store the provided fluid and/or to route the provided fluid away from the flow controller or from the receiving tank.

Example A55 includes the method of example A51 or any of examples A51-A59, the method comprising allowing a gas to enter or exit the internal volume of the flow controller through a vent port on an outside of the flow controller leading through a vent conduit to the internal volume.

Example A56 includes the method of example A51 or any of examples A51-A59, wherein a rate of providing the fluid into the fluid containment tank is equal to or greater than a rate of providing the fluid from the fluid containment tank to the receiving tank or to the flow controller.

Example A57 includes the method of example A51 or any of examples A51-A59, wherein the controlling the flow of the fluid through the flow controller is operated by a motor that is controlled using a system programmable logic controller (PLC).

Example A58 includes the method of example A51 or any of examples A51-A59, the method comprising establishing a calibration relationship between a change in a flow rate of a fluid flow through the flow controller and a number of movements of a moveable component that moves to achieve the change in the flow rate.

Example A59 includes the method of example A51 or any of examples A51-A58, the method comprising measuring a flow rate of a fluid flow through the flow controller, comparing the measured flow rate with a pre-set flow rate value, and changing the flow rate based on the comparison outcome by controlling, through a system programmable logic controller, a motor to rotate a shaft a number of rotations determined using the calibration relationship.

In some embodiments in accordance with the present technology (example A60), a flow controller device for controlling a flow rate of a fluid includes an enclosure having (i) an inflow port, (ii) an outflow port, and (iii) an internal volume between the inflow port and the outflow port, wherein the inflow port is configured to allow a fluid to enter the internal volume, and wherein the outflow port is configured to allow the fluid to exit the internal volume; and an actuator assembly configured to move the enclosure along a vertical direction aligned with the direction of gravity so as to control a flow of the fluid through and out of the flow controller device, wherein the flow controller device is configured to control a flow rate of the fluid through the internal volume by changing a position of the internal volume along the vertical direction relative to (1) a position of a receiving tank that provides the fluid to the inflow port of the flow controller device and (2) an upper level of the fluid in a fluid containment tank that supplies the fluid to the receiving tank, wherein a change of the position of the internal volume changes a hydraulic resistance of a path from the fluid containment tank to the outflow port of the flow controller through the internal volume.

Example A61 includes the device of example A60, wherein the flow controller device is operable as the flow controller in any of the systems of examples A1-A16 or A37-A50, or in any of the methods of examples A17-A36 or A51-A59.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A device for fluid flow control in wastewater treatment, comprising: a wastewater containment tank fluidically coupled to an external fluid input device and structured to enclose an interior space to contain input fluid when received from the external fluid input device, the wastewater containment tank comprising a first access opening to the interior space to allow the input fluid to enter the interior space, and a second access opening to the interior space to allow the input fluid to exit the interior space to an external fluid processing device to yield a treated water that is outputted out of an output port of the external fluid processing device: and a flow control system fluidically coupled to the external fluid processing device, where the flow control system comprises: an enclosure having (i) an inflow port, (ii) an outflow port, and (iii) an internal volume between the inflow port and the outflow port, the inflow port providing a third access opening to the internal volume to allow a fluid to enter the internal volume, and the outflow port providing a fourth access opening to the internal volume to allow the fluid to exit the internal volume, and an actuator assembly configured to move the enclosure along a vertical direction aligned with the direction of gravity so as to control a flow of the fluid through and out of the flow control system, wherein the flow control system is configured to control a flow rate of the fluid through the internal volume by changing a position of the internal volume relative to (1) a position of the external fluid processing device and (2) an upper level of the input fluid in the wastewater containment tank along the vertical direction, wherein a change of the position of the internal volume changes a hydraulic resistance of a path from the wastewater containment tank to the outflow port of the flow control system through the internal volume, wherein the enclosure of the flow control system is configured in an inverse U-like shape such that the inflow port and the outflow port are lower in the vertical direction than the interior volume.

2. The device of claim 1 wherein the wastewater containment tank of the device is fluidically coupled to a wastewater pretreatment system, and the input fluid contained by the wastewater containment tank includes a pre-treated wastewater.

3. The device of claim 1 wherein the wastewater containment tank of the device is fluidically coupled to a microbial fuel cell (MFC) device, as the external fluid processing device fluidically coupled to the flow control system, the MFC device having an input port to allow the exited input fluid to enter the MFC device from the wastewater containment tank, wherein the MFC device is operable to bioelectrochemically process the exited input fluid by concurrently generating electrical energy and digesting matter in the exited input fluid to yield the treated water that is outputted out of an output port of the MFC device to the flow control system.

4. The device of claim 1, wherein the actuator assembly of the flow control system comprises:
   a holding plate coupled to the enclosure;
   a shaft coupled to the holding plate and aligned in the vertical direction; and
   a motor operatively coupled to the shaft to cause the shaft to move so as to drive the holding plate to move in the vertical direction.

5. The device of claim 4, wherein the actuator assembly includes a programmable logic controller (PLC).

6. The device of claim 5, wherein the PLC is configured to automatically adjust a position of the holding plate when an average of the flow of the fluid deviates from a target flow rate by more than a preset amount to adjust the flow rate until the flow rate is within a pre-determined range from the target flow rate.

7. The device of claim 5, wherein the PLC is configured to control the motor to rotate the shaft a number of rotations based on a calibration.

8. A system for controlling a flow rate of a fluid, comprising:
   a fluid containment tank structured to enclose a first interior space to contain the fluid, the fluid containment tank comprising a first access opening to the first interior space to allow the fluid to enter the first interior space, a second access opening to the first interior space to allow the fluid to exit the first interior space, a third access opening to the first interior space to allow the fluid to exit the first interior space, and an overflow conduit fluidically coupled to the fluid containment tank at the third access opening at a first end of the overflow conduit, the overflow conduit having a portion extending from the first end into the first interior space to a second end of the overflow conduit wherein the second end of the overflow conduit provides a fourth access opening into a hollow channel within the overflow conduit, the hollow channel spanning to the first end, and wherein the overflow conduit is configured to control an upper level of the fluid contained in the fluid containment tank;
   a receiving tank fluidically coupled to the fluid containment tank and structured to enclose a second interior space to contain the fluid, the receiving tank comprising a fifth access opening to the second interior space to allow the fluid to enter the second interior space, and a sixth access opening to the second interior space to allow the fluid to exit the second interior space; and
   a flow controller fluidically coupled to the receiving tank and comprising an enclosure having (i) an inflow port, (ii) an outflow port, and (iii) an internal volume between the inflow port and the outflow port, wherein the inflow port is configured to allow the fluid to enter the internal volume, and wherein the outflow port is configured to allow the fluid to exit the internal volume, and an actuator assembly configured to move the enclosure along a vertical direction aligned with the direction of gravity so as to control a flow of the fluid through and out of the flow controller, wherein the flow controller is configured to control a flow rate of the fluid through the internal volume by changing a position of the internal volume relative to (1) a position of the receiving tank and (2) the upper level of the fluid in the fluid containment tank along the vertical direction, wherein a change of the position of the internal volume changes a hydraulic resistance of a path from the fluid containment tank to the outflow port of the flow controller through the internal volume.

9. The system of claim 8, wherein the system includes one or more of:
- the second access opening of the fluid containment tank fluidically coupled to the fifth access opening of the receiving tank;
- wherein the inflow port of the flow controller fluidically coupled to the receiving tank at the sixth access opening;
- wherein the second access opening of the fluid containment tank fluidically coupled to the inflow port of the flow controller,
- wherein the outflow port of the flow controller fluidically coupled to the receiving tank at the fifth access opening.

10. The system of claim 8, wherein the enclosure of the flow controller is configured in an inverse U-like shape such that the inflow port and the outflow port are lower in the vertical direction than the interior volume.

11. The system of claim 8, wherein the actuator assembly comprises:
- a holding plate coupled to the enclosure;
- a shaft coupled to the holding plate and aligned in the vertical direction; and
- a motor operatively coupled to the shaft to cause the shaft to move so as to drive the holding plate to move in the vertical direction,
- wherein the shaft is configured to rotate about an axis aligned in the vertical direction.

12. The system of claim 8, wherein the actuator assembly is coupled to a post aligned in the vertical direction and configured to support the actuator assembly.

13. The system of claim 8, wherein the flow controller is configured to increase the flow rate when a distance between the position of the internal volume and the position of the receiving tank decreases in the vertical direction and a height between the position of the receiving tank and the upper level of the fluid in the fluid containment tank is held constant in the vertical direction.

14. The system of claim 8, wherein the flow controller is configured to decrease the flow rate when a distance between the position of the internal volume and the position of the receiving tank increases in the vertical direction and a height between the position of the receiving tank and the upper level of the fluid in the fluid containment tank is held constant in the vertical direction.

15. The system of claim 8, comprising: a water collection system fluidically coupled to the flow controller or to the receiving tank and configured to (i) store the fluid received by the water collection system from the flow controller or from the receiving tank, (ii) route the fluid received by the water collection system from the flow controller or from the receiving tank away from the flow controller or from the receiving tank, or (iii) store the fluid received by the water collection system from the flow controller or from the receiving tank and route the fluid received by the water collection system from the flow controller or from the receiving tank away from the flow controller or from the receiving tank.

16. The system of claim 8, wherein the flow controller comprises a vent port configured to allow a gas to enter or exit the internal volume, and a vent conduit coupled to the flow controller at the vent port at a first end of the vent conduit, the vent conduit having a portion extending from the first end of the vent conduit along the vertical direction to a second end of the vent conduit, wherein the vent conduit is configured to route the gas through the vent conduit between the first end of the vent conduit and the second end of the vent conduit into the flow controller or out of the flow controller.

17. The system of claim 8, further comprising:
- a wastewater pretreatment system to pre-treat wastewater by removing at least some solid particles from the wastewater and produce a pre-treated wastewater, wherein the fluid containment tank is fluidically coupled to the wastewater pretreatment system and structured to enclose an interior space to contain the pre-treated wastewater; and
- a microbial fuel cell (MFC) device fluidically coupled between the fluid containment tank and the flow controller device, the MFC device having an input port to allow the pre-treated wastewater to enter the MFC device from the fluid containment tank, wherein the MFC device is operable to bioelectrochemically process the pre-treated wastewater by concurrently generating electrical energy and digesting matter in the pre-treated wastewater to yield a treated water that is outputted out of an output port of the MFC device to the flow controller device.

* * * * *